US011586623B2

(12) United States Patent
Karlapudi et al.

(10) Patent No.: US 11,586,623 B2
(45) Date of Patent: *Feb. 21, 2023

(54) EFFICIENT TIME-RANGE QUERIES ON DATABASES IN DISTRIBUTED COMPUTING SYSTEMS

(71) Applicant: VMware, Inc., Palo Alto, CA (US)

(72) Inventors: Sai Samrat Karlapudi, San Mateo, CA (US); Ramsès V. Morales, Sunnyvale, CA (US); Michael M. Hu, Fremont, CA (US)

(73) Assignee: VMware, Inc., Palo Alto, CA (US)

( * ) Notice: Subject to any disclaimer, the term of this patent is extended or adjusted under 35 U.S.C. 154(b) by 106 days.

This patent is subject to a terminal disclaimer.

(21) Appl. No.: 17/087,492

(22) Filed: Nov. 2, 2020

(65) Prior Publication Data

US 2021/0049172 A1    Feb. 18, 2021

Related U.S. Application Data

(63) Continuation of application No. 15/908,480, filed on Feb. 28, 2018, now Pat. No. 10,824,623.

(51) Int. Cl.
*G06F 16/00* (2019.01)
*G06F 16/2453* (2019.01)
(Continued)

(52) U.S. Cl.
CPC .... *G06F 16/24542* (2019.01); *G06F 16/2255* (2019.01); *G06F 16/2462* (2019.01);
(Continued)

(58) Field of Classification Search
CPC ...... G06F 16/137; G06F 16/14; G06F 16/152; G06F 16/2255; G06F 16/22;
(Continued)

(56) References Cited

U.S. PATENT DOCUMENTS 5,060,150 A    10/1991   Simor
6,970,865 B1   11/2005   Plasek et al.
(Continued)

FOREIGN PATENT DOCUMENTS

| WO | WO2008058954 A1 * | 5/2008 |
| WO | WO2014082052 A2 * | 5/2014 |
| WO | WO2019100063 A1 * | 5/2019 |

OTHER PUBLICATIONS

A. Dekhtyar et al., "Semistructured probabilistic databases", Proceedings Thirteenth International Conference on Scientific and Statistical Database Management. SSDBM , Jul. 2001, pp. 36-45.*
(Continued)

*Primary Examiner* — Srirama Channavajjala
(74) *Attorney, Agent, or Firm* — Dentons US LLP

(57) ABSTRACT

The present disclosure relates to querying data cores for data items that correspond to a specified time range. Probabilistic data structures corresponding to associated data cores are used to filter the plurality of data cores to identify a subset of data cores that contain data items corresponding to the specified time range. Only the subset of the plurality of data cores determined to contain relevant data items are searched.

14 Claims, 7 Drawing Sheets

(51) Int. Cl.
*G06F 16/27* (2019.01)
*G06F 16/22* (2019.01)
*G06F 16/2458* (2019.01)
*G06N 7/00* (2023.01)
*G06F 16/2455* (2019.01)

(52) U.S. Cl.
CPC .... *G06F 16/2477* (2019.01); *G06F 16/24553* (2019.01); *G06F 16/27* (2019.01); *G06F 16/278* (2019.01); *G06N 7/005* (2013.01)

(58) Field of Classification Search
CPC .. G06F 16/2228; G06F 16/2264; G06F 16/31; G06F 16/313; G06F 16/316; G06F 16/41; G06F 16/61; G06F 16/63; G06F 16/901; G06F 16/71; G06F 16/144; G06F 16/156; G06F 16/219; G06F 16/24542; G06F 16/27; G06F 16/2477; G06F 16/278; G06F 16/2462; H04L 67/1097
See application file for complete search history.

(56) References Cited

U.S. PATENT DOCUMENTS

| | | | |
|---|---|---|---|
| 7,215,970 B2 | 5/2007 | Corrigan et al. | |
| 7,444,679 B2 | 10/2008 | Tarquini et al. | |
| 7,953,571 B2 | 5/2011 | Odaka et al. | |
| 8,145,669 B2 | 3/2012 | Cormode et al. | |
| 8,291,490 B1 | 10/2012 | Ahmed et al. | |
| 8,375,060 B2 | 2/2013 | Dewar et al. | |
| 8,405,944 B2* | 3/2013 | Donolo | H02H 7/261 361/60 |
| 8,498,996 B2 | 7/2013 | Whitcher et al. | |
| 8,713,618 B1* | 4/2014 | Kuznetsov | H04N 21/8133 725/38 |
| 8,738,608 B2 | 5/2014 | Pauly | |
| 8,745,014 B2* | 6/2014 | Travis | G06F 16/2477 707/700 |
| 8,768,962 B2 | 7/2014 | Laron | |
| 8,949,224 B2 | 2/2015 | Gupta | |
| 9,047,558 B2 | 6/2015 | Hochstein | |
| 9,418,101 B2 | 8/2016 | He et al. | |
| 9,437,022 B2 | 9/2016 | Vander Broek | |
| 9,514,183 B1 | 12/2016 | Alla | |
| 9,578,046 B2* | 2/2017 | Baker | H04L 63/1416 |
| 9,582,500 B2 | 2/2017 | Mcgillin et al. | |
| 9,712,887 B2 | 7/2017 | Myers et al. | |
| 9,717,011 B2 | 7/2017 | Huang et al. | |
| 9,817,851 B2 | 11/2017 | Dumant et al. | |
| 9,892,237 B2* | 2/2018 | Greenfield | G16C 99/00 |
| 9,898,334 B1 | 2/2018 | Dongare et al. | |
| 10,044,578 B2 | 8/2018 | He et al. | |
| 10,073,903 B1 | 9/2018 | Arye et al. | |
| 10,242,061 B2 | 3/2019 | Luo et al. | |
| 10,445,334 B1 | 10/2019 | Xiao et al. | |
| 10,445,479 B2 | 10/2019 | Rao et al. | |
| 10,459,898 B2* | 10/2019 | Yanacek | G06F 16/213 |
| 10,460,277 B2 | 10/2019 | Dumant et al. | |
| 10,496,653 B1 | 12/2019 | Epshteyn et al. | |
| 10,776,319 B2* | 9/2020 | Eichinger | G06F 16/1744 |
| 2002/0152254 A1 | 10/2002 | Teng | |
| 2004/0002956 A1 | 1/2004 | Chaudhuri et al. | |
| 2004/0215644 A1 | 10/2004 | Edwards et al. | |
| 2005/0114505 A1 | 5/2005 | Destefano et al. | |
| 2005/0120062 A1* | 6/2005 | Sinha | G06F 16/219 707/999.203 |
| 2007/0061291 A1 | 3/2007 | Azizi | |
| 2007/0078827 A1 | 4/2007 | Sareen et al. | |
| 2008/0010268 A1 | 1/2008 | Liao et al. | |
| 2011/0153953 A1 | 6/2011 | Khemani et al. | |
| 2012/0060165 A1 | 3/2012 | Clarke | |
| 2012/0207046 A1 | 8/2012 | Di et al. | |
| 2013/0227573 A1 | 8/2013 | Morsi et al. | |
| 2014/0068578 A1 | 3/2014 | Gedik et al. | |
| 2014/0109097 A1 | 4/2014 | Datla et al. | |
| 2014/0143505 A1 | 5/2014 | Sim et al. | |
| 2014/0172867 A1 | 6/2014 | Lin et al. | |
| 2015/0040121 A1 | 2/2015 | Barabash et al. | |
| 2015/0095097 A1 | 4/2015 | Dejardine et al. | |
| 2015/0186434 A1 | 7/2015 | Eichinger et al. | |
| 2015/0286661 A1 | 10/2015 | Deluca et al. | |
| 2016/0092484 A1* | 3/2016 | Finkler | G06F 16/258 707/715 |
| 2016/0162543 A1 | 6/2016 | Gustafson et al. | |
| 2016/0179063 A1 | 6/2016 | De et al. | |
| 2016/0358084 A1 | 12/2016 | Bloomquist et al. | |
| 2016/0378802 A1* | 12/2016 | Hayes | G06F 16/24553 707/741 |
| 2017/0004006 A1 | 1/2017 | Mori et al. | |
| 2017/0039080 A1* | 2/2017 | Chadha | G06F 9/45558 |
| 2017/0068727 A1 | 3/2017 | Rubin et al. | |
| 2017/0177263 A1 | 6/2017 | Das et al. | |
| 2018/0103081 A1 | 4/2018 | Fawcett | |
| 2018/0137169 A1 | 5/2018 | Zhao | |
| 2018/0181632 A1 | 6/2018 | Zarum et al. | |
| 2018/0196824 A1 | 7/2018 | Bitincka et al. | |
| 2018/0270164 A1 | 9/2018 | Ahmed et al. | |
| 2018/0278500 A1 | 9/2018 | Feamster et al. | |
| 2018/0293275 A1 | 10/2018 | P et al. | |
| 2018/0329644 A1 | 11/2018 | Das et al. | |
| 2019/0073373 A1 | 3/2019 | Surale et al. | |
| 2019/0155850 A1 | 5/2019 | Shi et al. | |
| 2019/0226898 A1 | 7/2019 | Gray, Jr. | |
| 2019/0236182 A1 | 8/2019 | Tiyyagura et al. | |
| 2019/0236183 A1 | 8/2019 | Tiyyagura et al. | |
| 2019/0236185 A1 | 8/2019 | Tiyyagura et al. | |
| 2019/0236197 A1 | 8/2019 | Karlapudi et al. | |
| 2019/0266273 A1 | 8/2019 | Karlapudi et al. | |
| 2019/0268227 A1 | 8/2019 | Desai | |
| 2019/0268401 A1 | 8/2019 | Desai et al. | |
| 2019/0286719 A1 | 9/2019 | Morales et al. | |
| 2020/0167361 A1 | 5/2020 | Princehouse et al. | |

OTHER PUBLICATIONS

Shihua Chen et al., "Distributed Metadata Management Based on Hierarchical Bloom Filters in Data Grid", 2009 Fourth ChinaGrid Annual Conference, Nov. 2009, pp. 95-101.*
Final Office Action received for U.S. Appl. No. 15/881,376, dated Aug. 14, 2020, 12 pages.
Final Office Action received for U.S. Appl. No. 15/881,382, dated Aug. 18, 2020, 13 pages.
Final Office Action received for U.S. Appl. No. 15/881,396, dated Sep. 15, 2020, 13 pages.
Final Office Action received for U.S. Appl. No. 15/908,690, dated Jun. 16, 2020, 19 pages.
Non-Final Office Action received for U.S. Appl. No. 15/925,464, dated Apr. 28, 2020, 9 pages.
Notice of Allowance received for U.S. Appl. No. 15/881,364, dated Aug. 4, 2020, 10 pages.
Notice of Allowance received for U.S. Appl. No. 15/908,693, dated Jun. 12, 2020, 7 pages.
Notice of Allowance received for U.S. Appl. No. 15/925,464, dated Nov. 23, 2020, 10 pages.
Unpublished U.S. Appl. No. 17/074,048, filed Oct. 19, 2020, titled "Impartial Buffering in Stream Processing".
Non-Final Office Action received for U.S. Appl. No. 15/881,364, dated Dec. 26, 2019, 15 pages.
Non-Final Office Action received for U.S. Appl. No. 15/881,376, dated Mar. 26, 2020, 13 pages.
Non-Final Office Action received for U.S. Appl. No. 15/881,382, dated Mar. 26, 2020, 13 pages.
Non-Final Office Action received for U.S. Appl. No. 15/881,396, dated Feb. 13, 2020, 13 pages.
Non-Final Office Action received for U.S. Appl. No. 15/908,480, dated Dec. 4, 2019, 13 pages.
Non-Final Office Action received for U.S. Appl. No. 15/908,690, dated Oct. 22, 2019, 15 pages.

(56) References Cited

OTHER PUBLICATIONS

Non-Final Office Action received for U.S. Appl. No. 15/908,693, dated Dec. 10, 2019, 25 pages.
Notice of Allowance received for U.S. Appl. No. 15/908,480, dated Jul. 8, 2020, 10 pages.

* cited by examiner

Table 500

| Data Items | Ref. Time Value | Hashing functions used to add a member to the set | Look up PDS 1 | Look up PDS 2 | Result |
|---|---|---|---|---|---|
| 1 (Core 1) 3 (Core 2) | 117 502 506 | 502A hash_function1(117) = 2 502D 502B hash_function2(117) = 9 502E 502C hash_function3(117) = 3 502F | lookup(117) = 1 | lookup(117) = 1 | Possibility of data cores 1 and 2 both containing data items. |
| 2 (Core 1) | 717 504 | 504A hash_function1(717) = 3 504D 504B hash_function2(717) = 0 504E 504C hash_function3(717) = 1 504F | lookup(717) = 1 | lookup(717) = 0 | Possibility of data core 1 containing data items. |
| 4 (Core 2) | 216 508 | 508A hash_function1(216) = 5 508D 508B hash_function2(216) = 7 508E 508C hash_function3(216) = 1 508F | lookup(216) = 0 | lookup(216) = 1 | Possibility of data core 2 containing data items. |
| 5 (NA) | 518 510 | hash_function_1(518) = 4 hash_function_2(518) = 6 hash_function_3(518) = 10 | lookup(518) = 0 | lookup(518) = 0 | Definitely not in data cores 1 or 2. |

FIG. 5

EFFICIENT TIME-RANGE QUERIES ON DATABASES IN DISTRIBUTED COMPUTING SYSTEMS

CROSS-REFERENCE TO RELATED APPLICATIONS

This application is a continuation of U.S. patent application Ser. No. 15/908,480, entitled "EFFICIENT TIME-RANGE QUERIES ON DATABASES IN DISTRIBUTED COMPUTING SYSTEMS", filed Feb. 28, 2018, the contents of which is hereby incorporated by reference in its entirety.

FIELD

The present disclosure relates generally to querying databases in a distributed computing system, and more specifically to using time-ranges to query databases stored across multiple data cores in a distributed computing system.

BACKGROUND

Modern distributed information systems are increasingly complex and can include thousands of host computing devices, virtual machines (VMs) and networking components, servicing an even larger number of clients. Components of these systems produce massive volumes of machine-generated log data or data records (application logs, network traces, configuration files, messages, performance data, system state dumps, etc.). Log data provides valuable information to system administrators as they manage these complex systems. Log data can also be useful in troubleshooting, discovering trends, detecting security problems, and measuring performance. Thus, it is important for a user to be able to query for specific log data or data records.

In a distributed computing system where log data is stored across multiple data cores, it is challenging to determine which data core to query for log data at a specific time. Traditionally, a request for log data corresponding to a specific time range would result in every data core in the distributed computing system being searched, which is both time consuming and expensive. In order to more efficiently search data cores, keeping track of which data items are stored on each data core is necessary. A typical brute force approach maintains a list of timestamps corresponding to each data item in each data core. This mapping allows the relevant data cores containing the data items of interest to be identified without having to search every data core. However, maintaining a list of the timestamps of every data item stored on the data core is neither scalable nor efficient. To alleviate expensive searches, an improved approach stores a minimum and a maximum time value to track a time range of the log data stored on each data core. While this approach reduces the amount of metadata needed to map data items to data cores, this approach breaks down when the minimum and maximum time values of every data core cover large time ranges, resulting in every searchable time range to be covered within every data core. This may happen when log data containing random time stamps outside of an expected time range is ingested. As a result the minimum and maximum values of each data core may overlap with other data cores or be the same, thereby causing the time range covered by one data core to be indistinguishable from that of another. As the volume of log data continues to grow, the need for a more reliable and scalable technique for identifying data cores for targeted searches becomes more readily apparent.

SUMMARY

The present disclosure describes techniques for efficiently processing time-range queries on databases in a distributed computing system by using probabilistic data structures to determine a subset of the plurality of data cores to query. Using this technique, time-range queries are more efficiently executed by not having to search every data core in the distributed computing system.

In some embodiments, a method is described. The method describes processing time-range queries on databases with timestamped data items stored across a plurality of data cores of a data plane in a distributed computing system, the method comprising: at a management plane of the distributed computing system: processing a received search request for one or more data items, wherein the search request includes a specified time range; determining a set of query time values spanning the specified time range, wherein the set of query time values is determined according to a predetermined time resolution; querying a plurality of probabilistic data structures using the set of query time values, wherein each probabilistic data structure is associated with a respective data core of the plurality of data cores, and wherein each probabilistic data structure indexes a respective set of reference time values corresponding to timestamps of data items stored in the respective data core; determining, based on querying the plurality of probabilistic data structures, which of the plurality of data cores contains one or more data items corresponding to the specified time range; and in accordance with a determination that a subset of the plurality of data cores contains one or more data items corresponding to the specified time range, executing the search request on the one or more data items stored in the subset of the plurality of data cores.

In some embodiments, the search request is not executed using any data core not in the subset of the plurality of data cores. The method further includes, in accordance with a determination that none of the plurality of data cores contain one or more data items corresponding to the specified time range, forgoing execution of the search request.

In some embodiments, a size of each probabilistic data structure is based on an ingestion rate of data items by the data plane. In some embodiments, a false positive rate of a probabilistic data structure of the plurality of probabilistic data structures is based on a size of the probabilistic data structure. In some embodiments, the predetermined time resolution is based on an ingestion rate of data items by the data plane.

In some embodiments, the plurality of probabilistic data structures are stored as metadata in the management plane. In some embodiments, each probabilistic data structure does not index the timestamps of the data items stored in the respective data core. In some embodiments, one or more of the plurality of probabilistic data structures each comprise a bloom filter.

In some embodiments, each reference time value in the set of reference time values indexed by a probabilistic data structure of the plurality of probabilistic data structures is a unique time value in the set of reference time values. In some embodiments, a time resolution of each reference time value of the set of reference time values indexed by a probabilistic data structure of the plurality of probabilistic data structures is lower than a time resolution of each timestamp of data items stored in a respective data core of the plurality of data cores.

In some embodiments, querying the plurality of probabilistic data structures comprises, for each probabilistic data structure: determining whether one or more query time values of the set of query time values are members of the respective set of reference time values indexed in the respective probabilistic data structure. In some embodiments, a data core of the plurality of data cores is determined to contain one or more data items corresponding to the specified time range in accordance with a determination that one or more query time values of the set of query time values are members of the respective set of reference time values indexed in the associated probabilistic data structure for the data core. In some embodiments, none of the plurality of data cores are determined to contain one or more data items corresponding to the specified time range in accordance with a determination that each query time value of the set of query time values is not a member of any set of reference time values indexed in any of the plurality of probabilistic data structure.

In some embodiments, a hash function is used to index the respective set of reference time values in the respective probabilistic data structure. In some embodiments, a predetermined number of hash functions are used to index the respective set of reference time values in the respective probabilistic data structure. A false positive rate of each probabilistic data structure is based on a respective number of hash functions used to index the respective set of reference time values in the respective probabilistic data structure.

In some embodiments, a non-transitory computer-readable medium is described. The non-transitory computer-readable storage medium comprising one or more programs configured to be executed by one or more processors of a distributed computing system for processing time-range queries on databases with timestamped data items stored across a plurality of data cores, the distributed computing system implementing a management plane and a plurality of data cores of a data plane, the one or more programs including instructions for: at a management plane of the distributed computing system: processing a received search request for one or more data items, wherein the search request includes a specified time range; determining a set of query time values spanning the specified time range, wherein the set of query time values is determined according to a predetermined time resolution; querying a plurality of probabilistic data structures using the set of query time values, wherein each probabilistic data structure is associated with a respective data core of the plurality of data cores, and wherein each probabilistic data structure indexes a respective set of reference time values corresponding to timestamps of data items stored in the respective data core; determining, based on querying the plurality of probabilistic data structures, which of the plurality of data cores contains one or more data items corresponding to the specified time range; and in accordance with determining, based on querying the plurality of probabilistic data structures, that a subset of the plurality of data cores contains one or more data items corresponding to the specified time range, executing the search request on the one or more data items stored in the subset of the plurality of data cores.

In some embodiments, a transitory computer-readable medium is described. The transitory computer-readable storage medium comprising one or more programs configured to be executed by one or more processors of a distributed computing system for processing time-range queries on databases with timestamped data items stored across a plurality of data cores, the distributed computing system implementing a management plane and a plurality of data cores of a data plane, the one or more programs including instructions for: at a management plane of the distributed computing system: processing a received search request for one or more data items, wherein the search request includes a specified time range; determining a set of query time values spanning the specified time range, wherein the set of query time values is determined according to a predetermined time resolution; querying a plurality of probabilistic data structures using the set of query time values, wherein each probabilistic data structure is associated with a respective data core of the plurality of data cores, and wherein each probabilistic data structure indexes a respective set of reference time values corresponding to timestamps of data items stored in the respective data core; determining, based on querying the plurality of probabilistic data structures, which of the plurality of data cores contains one or more data items corresponding to the specified time range; and in accordance with determining, based on querying the plurality of probabilistic data structures, that a subset of the plurality of data cores contains one or more data items corresponding to the specified time range, executing the search request on the one or more data items stored in the subset of the plurality of data cores.

In some embodiments, a distributed computing system is described. The distributed computing system for processing time-range queries on databases with timestamped data items stored across a plurality of data cores, wherein the system implements a management plane and a plurality of data cores of a data plane, the system comprising: one or more processors; an memory storing one or more programs configured to be executed by the one or more processors, the one or more programs including instructions for: at a management plane of the distributed computing system: processing a received search request for one or more data items, wherein the search request includes a specified time range; determining a set of query time values spanning the specified time range, wherein the set of query time values is determined according to a predetermined time resolution; querying a plurality of probabilistic data structures using the set of query time values, wherein each probabilistic data structure is associated with a respective data core of the plurality of data cores, and wherein each probabilistic data structure indexes a respective set of reference time values corresponding to timestamps of data items stored in the respective data core; determining, based on querying the plurality of probabilistic data structures, which of the plurality of data cores contains one or more data items corresponding to the specified time range; and in accordance with determining, based on querying the plurality of probabilistic data structures, that a subset of the plurality of data cores contains one or more data items corresponding to the specified time range, executing the search request on the one or more data items stored in the subset of the plurality of data cores.

In some embodiments, a distributed computing system is described. The distributed computing system for processing time-range queries on databases with timestamped data items stored across a plurality of data cores, wherein the system implements a management plane and a plurality of data cores of a data plane, the system comprising means for: at a management plane of the distributed computing system: means for processing a received search request for one or more data items, wherein the search request includes a specified time range; means for determining a set of query time values spanning the specified time range, wherein the set of query time values is determined according to a predetermined time resolution; means for querying a plurality of probabilistic data structures using the set of query time values, wherein each probabilistic data structure is associated with a respective data core of the plurality of data cores, and wherein each probabilistic data structure indexes a respective set of reference time values corresponding to timestamps of data items stored in the respective data core; means for determining, based on querying the plurality of probabilistic data structures, which of the plurality of data cores contains one or more data items corresponding to the specified time range; and means for in accordance with determining, based on querying the plurality of probabilistic data structures, that a subset of the plurality of data cores contains one or more data items corresponding to the specified time range, executing the search request on the one or more data items stored in the subset of the plurality of data cores.

BRIEF DESCRIPTION OF THE DRAWINGS

In the following description, reference is made to the accompanying drawings which form a part thereof, and which illustrate several examples of the present disclosure. It is understood that other examples may be utilized and structural and operational changes may be made without departing from the scope of the present disclosure. The use of the same reference symbols in different drawings indicates similar or identical items.

FIG. 5 depicts a table of exemplary function calls used to add elements to a set and to a query set in a probabilistic data structure.

DETAILED DESCRIPTION

In the following description of examples, reference is made to the accompanying drawings in which are shown by way of illustration specific examples that can be practiced. It is to be understood that other examples can be used and structural changes can be made without departing from the scope of the various examples.

The present disclosure provides techniques for processing time-range queries on databases stored across a plurality of data cores in a distributed computing system. The management plane of the distributed computing system processes a search request for data items within a specified time range by determining a set of query time values spanning the specified time range in accordance with a predetermined time resolution. The management plane queries a plurality of probabilistic data structures using the set of query time values to determine which of the plurality of data cores contain data items corresponding to the specified time range. The search request is then executed on the subset of the plurality of data cores containing data items corresponding to the specified time range.

Figure 1A:
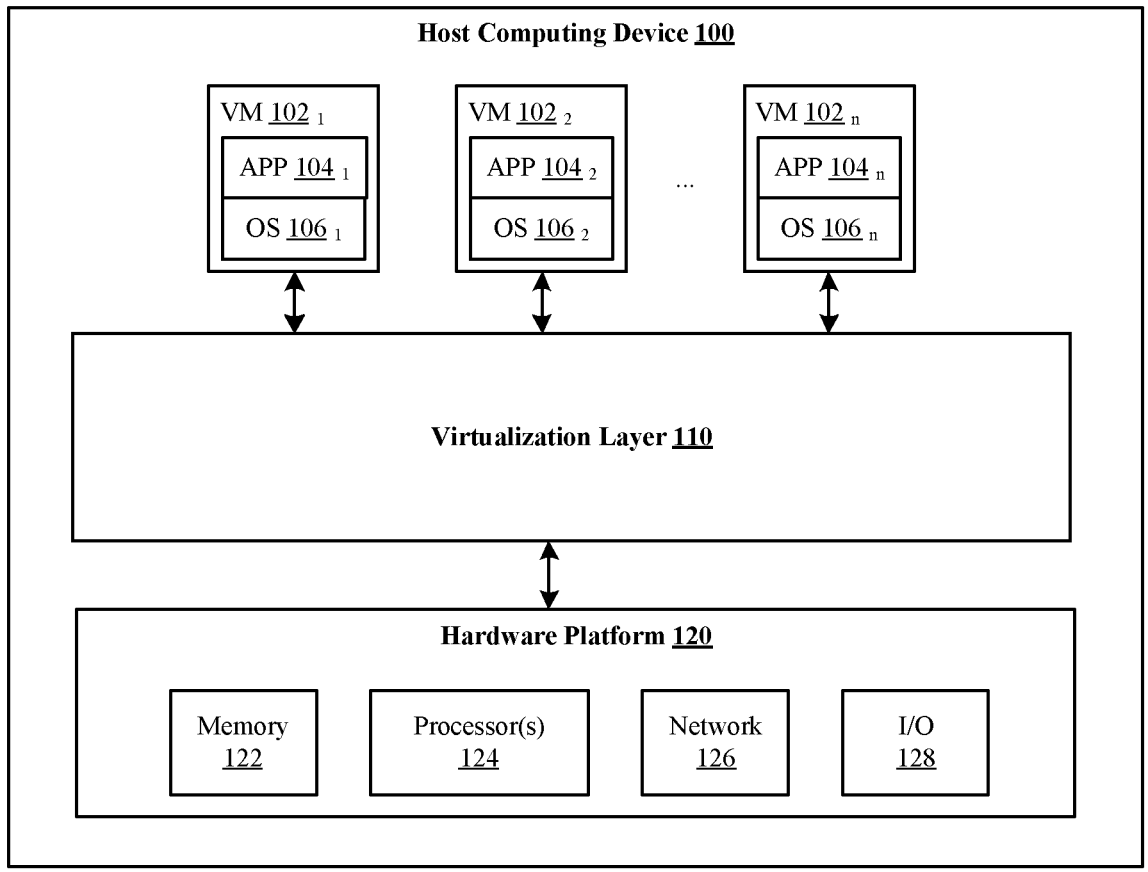
FIG. 1A depicts a block diagram illustrating an exemplary system and environment for implementing various components of a distributed computing system.

FIG. 1A is a block diagram illustrating an exemplary system and environment for implementing various components of a distributed computing system. As shown, virtual machines (VMs) $102_1, 102_2 \ldots 120_n$ are instantiated on host computing device 100. In some embodiments, host computing device 100 implements one or more elements of a distributed computing system (e.g., distributed computing system 200, described below with reference to FIG. 2). Hardware platform 120 includes memory 122, one or more processors 124, network interface 126, and various I/O devices 128. Memory 122 includes computer-readable storage medium. The computer-readable storage medium is, for example, tangible and non-transitory. For example, memory 122 includes high-speed random access memory and also includes non-volatile memory, such as one or more magnetic disk storage devices, flash memory devices, or other non-volatile solid-state memory devices. In some embodiments, the computer-readable storage medium of memory 122 stores instructions for performing the methods and processes described herein. In some embodiments, hardware platform 120 also includes other components, including power supplies, internal communications links and busses, peripheral devices, controllers, and many other components.

Virtualization layer 110 is installed on top of hardware platform 120. Virtualization layer 110, also referred to as a hypervisor, is a software layer that provides an execution environment within which multiple VMs 102 are concurrently instantiated and executed. The execution environment of each VM 102 includes virtualized components analogous to those comprising hardware platform 120 (e.g., a virtualized processor(s), virtualized memory, etc.). In this manner, virtualization layer 110 abstracts VMs 102 from physical hardware while enabling VMs 102 to share the physical resources of hardware platform 120. As a result of this abstraction, each VM 102 operates as though it has its own dedicated computing resources.

Each VM 102 includes operating system (OS) 106, also referred to as a guest operating system, and one or more applications (Apps) 104 running on or within OS 106. OS 106 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components. As in a traditional computing environment, OS 106 provides the interface between Apps 104 (i.e. programs containing software code) and the hardware resources used to execute or run applications. However, in this case the "hardware" is virtualized or emulated by virtualization layer 110. Consequently, Apps 104 generally operate as though they are in a traditional computing environment. That is, from the perspective of Apps 104, OS 106 appears to have access to dedicated hardware analogous to components of hardware platform 120.

Figure 1B:
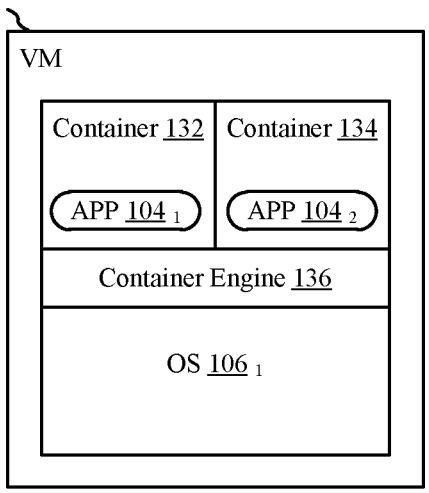
FIG. 1B depicts a block diagram illustrating an exemplary containerized application framework for implementing various components of a distributed computing system.

FIG. 1B is a block diagram illustrating an exemplary containerized application framework for implementing various components of a distributed computing system. More specifically, FIG. 1B illustrates VM $102_1$ implementing a containerized application framework. Containerization provides an additional level of abstraction for applications by packaging a runtime environment with each individual application. Container 132 includes App $104_1$ (i.e., application code), as well as all the dependencies, libraries, binaries, and configuration files needed to run App $104_1$. Container engine 136, similar to virtualization layer 110 discussed above, abstracts App $104_1$ from OS $106_1$, while enabling other applications (e.g., App $104_2$) to share operating system resources (e.g., the operating system kernel). As a result of this abstraction, each App 104 runs the same regardless of the environment (e.g., as though it has its own dedicated operating system).

It should be appreciated that applications (Apps) implementing aspects of the present invention are, in some embodiments, implemented as applications running within traditional computing environments (e.g., applications run on an operating system with dedicated physical hardware), virtualized computing environments (e.g., applications run on a guest operating system on virtualized hardware), containerized environments (e.g., applications packaged with dependencies and run within their own runtime environment), distributed computing environments (e.g., applications run on or across multiple physical hosts) or any combination thereof. Furthermore, while specific implementations of virtualization and containerization are discussed, it should be recognized that other implementations of virtualization and containers can be used without departing from the scope of the various described embodiments.

Figure 2:
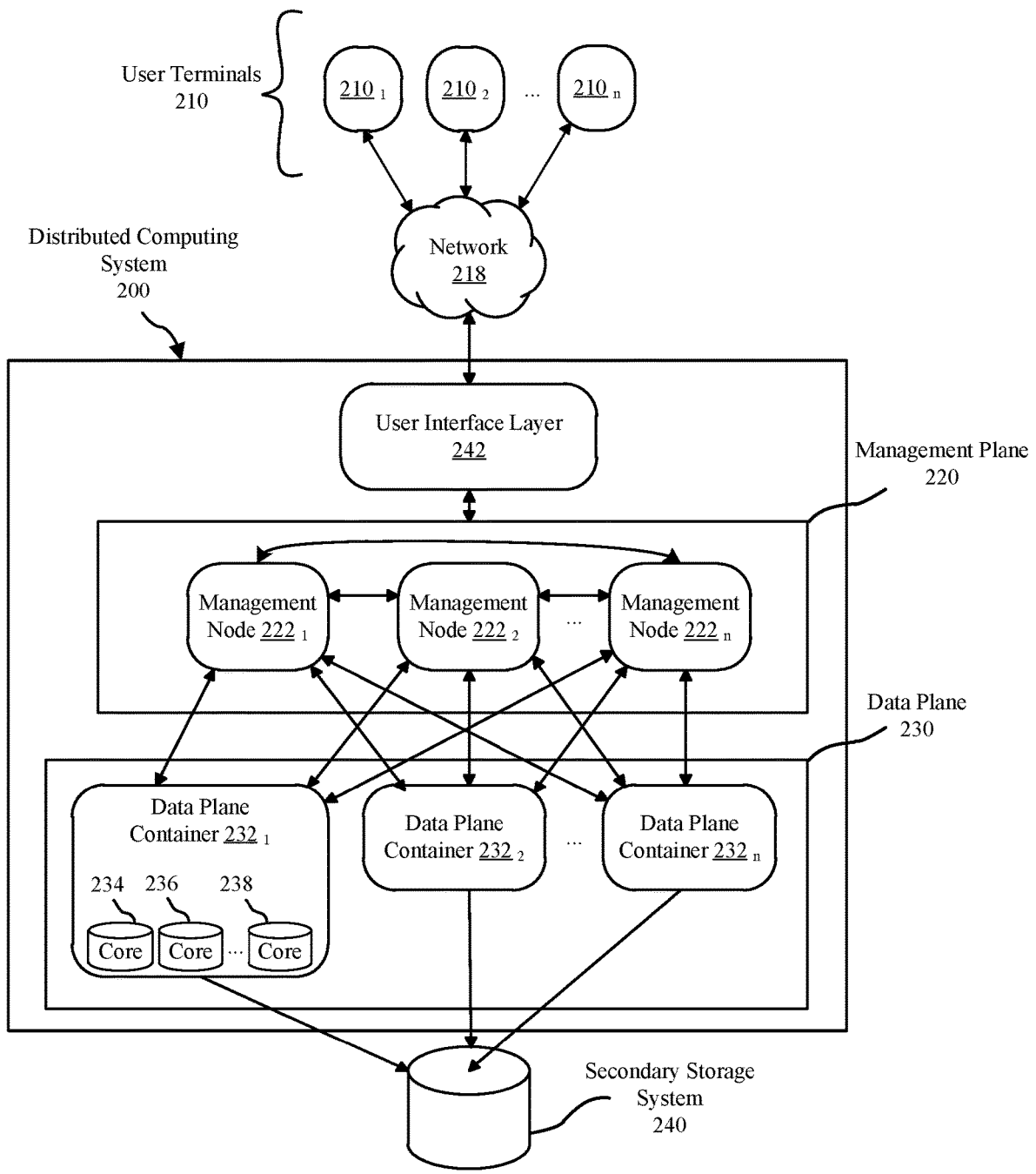
FIG. 2 depicts a block diagram illustrating exemplary systems and environment for searching log data in a distributed computing system.

FIG. 2 illustrates exemplary systems and environment for searching and retrieving data stored in distributed computing system 200. As shown, user terminals 210 are coupled to distributed computing system 200 through one or more communication networks 218. In particular, user terminals 210 communicate with user interface layer 242 of distributed computing system 200 via communication networks 218. The user interface layer 242 is configured to provide user interface functionalities via user terminals 210. The functionalities include, for example, searching for items stored by distributed computing system 200 and/or secondary storage system, displaying results of a query, analyzing results of a query, etc. In some embodiments, the user interface layer 242 runs on a dedicated physical host, as an application within a virtual machine, within a software container on a dedicated host, within a software container on a virtual machine, or any combination thereof. The user interface layer 242 is coupled to management plane 220 of distributed computing system 200. In some embodiments, user terminals 210 communicate with management plane 220 via user interface layer 242. In some embodiments, additional hardware and software components facilitate the transmission of data between user terminals 210 and management plane 220. For example, data can pass through a proxy server or load balancer before arriving at management nodes 222 within management plane 220, distributed computing distributed computing.

Examples of communication network(s) 218 include local area networks (LAN) and wide area networks (WAN), e.g., the Internet. Communication network(s) 118 is implemented using any known network protocol, including various wired or wireless protocols, such as, for example, Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol. Further, it is appreciated that, in some embodiments, physical communication networks, such as described above, are also implemented as software defined networks (SDN) or through software emulation.

Distributed computing system 200 includes management plane 220 and data plane 230. The terms "management plane" and "data plane" refer to functional descriptions of elements of distributed computing system 200 that perform specialized functions. Management plane 220 implements all business and management logic which allow an administrator to configure distributed computing system 200, including data plane functionality. For example, management plane 220 is configured to perform management functions, such as process user queries, persist user configurations, and execute operational tasks on management nodes 222 and data plane containers 232. Management plane 220 is also configured to, for example, perform tasks related to input validation, user management, policy management, and background task tracking. In some embodiments, management plane 220 provides a single API entry point to distributed computing system 200.

Management plane 220 includes one or more management nodes 222. Each management node 220 is an instantiation of management software (e.g., an application) which implements management functionality. Management node 222 runs on a dedicated physical host, as an application within a virtual machine, within a software container on a dedicated host, within a software container on a virtual machine, or any combination thereof. Each management node 222 is communicatively coupled to one another and to the data plane 230 via a communication interface(s) such as those described with respect to communications network 218. In some embodiments, each of the plurality of management nodes 222 independently implement management functionality for data plane 230. This redundancy improves reliability. For example, in situations where a management node (e.g., $222_1$) experiences a failure, another management node (e.g., $222_2$) can take over to maintain management functionality.

Data plane 230 is coupled to management plane 220. Data plane 230 is configured to perform data processing functionality. For example, data plane 230 implements packet switching, filtering, tagging, routing logic, and the like. In some embodiments, data plane 230 is configured to ingest data received from management plane and query stored data. The data plane 230 implements a database platform that provides database search functionality, such as text searching, hit highlighting, faceted searching, and indexing of items. The database platform is, for example, an Apache Solr™-based platform (developed by the Apache Software Foundation) that includes one or more Solr™ instances. Data plane 230 includes a collection of data plane containers 232. Each data plane container is an instance of a software application implementing data processing functionality within a container (e.g., container 132). In some embodiments, data plane containers 232 run on a dedicated host or within a virtualized environment such as VM $102_1$ on host computing device 100. Each data plane container 232 is associated with one or more data cores (e.g., cores 234, 236, and 238). A data core is an allocation of storage resources for files associated with a single tenant or customer. In some embodiments, a core spans one or more storage medias such as hard disks, solid state drives, virtual storage area network devices (VSANs), or the like. In some embodiments, each data core includes a database index with configuration, such as schema, caching, and the like. For example, each data core includes a set of memory structures that manages database files. In a specific example, each data core comprises a Solr™ core that includes a Lucene™ index.

Data plane 230 is further coupled to secondary storage system 240 via communication interface(s), such as those described with respect to communications network 218. Data plane containers 232 communicate with secondary storage system 240 and are configured to transfer data to and retrieve data from secondary storage system 240. Secondary storage system 240 is configured to provide additional data storage functions such as backing up data located on data plane containers 232 or serving as long-term storage for infrequently accessed data. In some embodiments, secondary storage system 240 includes one or more storage media such as hard disks, solid state drives, virtual storage area network devices (VSANs), or the like.

Although in the present embodiment, distributed computing system 200 includes management plane 220 and data plane 230, it should be recognized that, in other embodiments, distributed computing system 200 can include additional functional layers. For example, distributed computing system 200 can include additional software layers (e.g., applications) that facilitate functions related to providing alerts or notifications. In some embodiments, distributed computing systems 200 includes additional intermediate software layers for handling ingestion requests or user queries.

With reference to FIGS. 3-7, exemplary techniques for querying a plurality of probabilistic data structures associated with the plurality of data cores in a data plane container, determining a subset of data cores based on querying the plurality of probabilistic data structures, and executing the search request on the subset of data cores, are described below.

Figure 3:
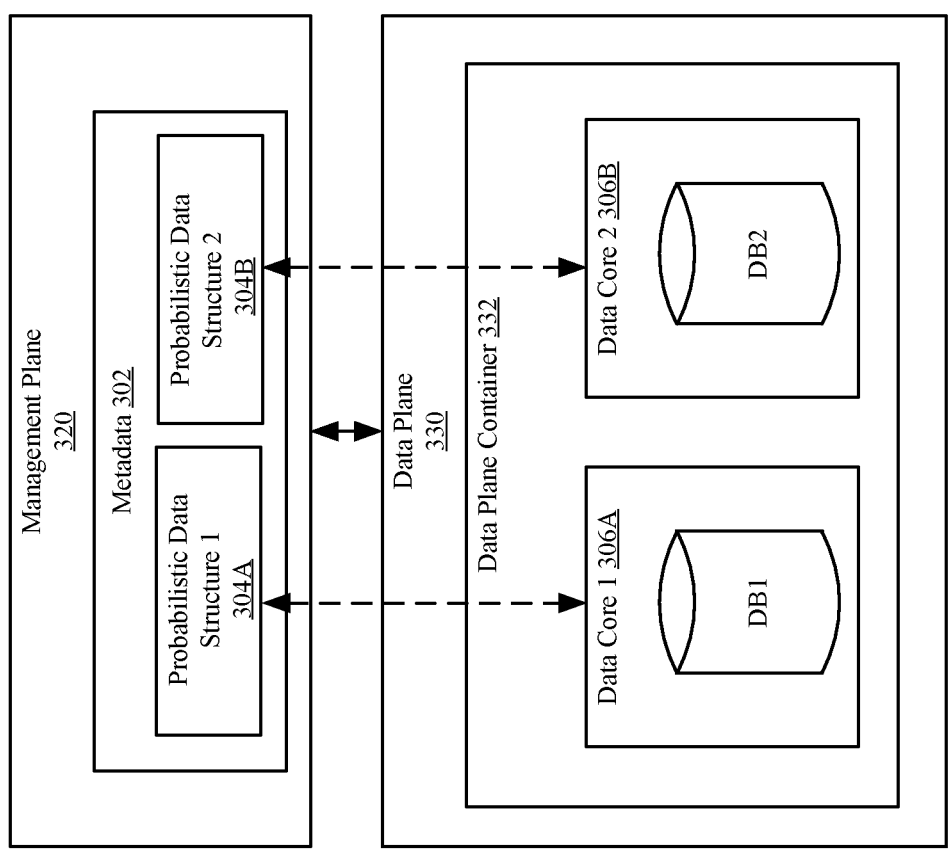
FIG. 3 depicts an exemplary management node and an exemplary data plane container.

FIG. 3 depicts an exemplary distributed computing system comprising management plane 320 and data plane 330. The distributed computing system is similar to distributed computing system 200, described with reference to FIG. 2. Management plane 320, data plane 330, and data plane container 332 in FIG. 3 are exemplary embodiments of management plane 220, data plane 230, and data plane containers $232_1$-$232_n$ in FIG. 2. In some embodiments, the management plane 320 receives queries and processes the received queries by determining which data cores in the data plane contain relevant data items that span the time range specified by the search request. In some embodiments, a query includes a search request. In some embodiments, management plane 320 receives and processes search requests for data items stored in data cores 306A and 306B, which are stored in data plane container 332 in data plane 330. In some embodiments, management plane 320 utilizes metadata 302 comprising probabilistic data structures 304A and 304B that are stored in management plane 320 to determine which data cores to execute the search request on. In some embodiments, only data cores found to possibly contain the requested data items are searched. In some embodiments, data cores that are unlikely to contain the requested data items are not searched. By limiting the search to a subset of data cores that possibly contain the requested data items, the management plane 320 avoids the overhead (e.g., process cycles) associated with searching every data core, where some data cores may not contain any requested data items. This pre-filtering of data cores improves the efficiency of the search by reducing the total search time and processing power required to traverse each data core.

In some embodiments, data plane 330 includes a plurality of data plane containers (e.g., data plane container 332) that contain a plurality of data cores (e.g., data cores 306A and 306B). Each data core contains databases that store the actual data items being queried. Typically only one data core is open at a time where an open data core ingests data items until it no longer has available storage to store data. Subsequently, a new data core is opened and the prior data core is closed. Because data cores are filled sequentially, each data core stores data items spanning an arbitrary time range depending on the timestamps of the data items ingested. In some embodiments, the data items contain timestamps that are chronological, resulting in the data core containing items within a particular time range. In some embodiments, the timestamps of the data items are in random order. In some embodiments, a data item includes a timestamp and a payload comprising the log data. In some embodiments, the timestamp of a data item includes one or more time components specifying a month, day, year, hour, minutes, and seconds. In some embodiments, log data includes data records.

In some embodiments, a data core indexes data items stored in the data core based on a particular time resolution. A time resolution includes any time component of a timestamp, which includes the month, day, year, hour, minutes, and seconds. In some embodiments, a data core stores data items with modified timestamps that only include the time components specified by the time resolution. For example, a data core using a time resolution of months stores data items with timestamps that include only the month and year. The remaining time components are discarded. In another example, a data core using a time resolution of hours stores data items with timestamps that include the hour, day, month, and year of the timestamp. In some embodiments, the time resolution is based on the ingestion rate of data items by the data plane. In some embodiments, a higher ingestion rate may result in a higher time resolution than a lower ingestion rate. In some embodiments, the time resolution used by the data core is adjustable and based on a plurality of factors. In some embodiments, the time resolution is based on the amount of storage available in the data core. In some embodiments, the time resolution is dynamically adjustable as data items are being ingested. In some embodiments, a customer specifies the time resolution.

In some embodiments, a data core is associated with a probabilistic data structure that is used to track the membership of data items that are stored in the respective data core based on the reference time values of the data items. In some embodiments, the reference time value is the full timestamp of a data item. In some embodiments, the reference time value is a modified timestamp that is adjusted according to the time resolution specified by the data core. A probabilistic data structure is useful for processing large data sets and determining the membership of data items in the data set because they do not require a lot of storage and have a constant query time. In some embodiments, the probabilistic data structure of each data core is stored as metadata in the management plane 320.

In some embodiments, the management plane 320 queries the plurality of probabilistic data structures to identify which data cores contain data items corresponding to the specified time range of a search request prior to executing the search. It is beneficial for the management plane 320 to be able to filter the plurality of data cores, so that only the data cores that potentially contain data items with timestamps within the requested time range are searched. Once a subset of relevant data cores is determined, the management plane 320 executes the search request on only the subset of data cores. This allows the management plane 320 to execute a more efficient search by targeting the data cores that possibly contain the requested data items, thereby saving time and processing resources. In some embodiments, the management plane 320 executes a search by generating a query to the data plane for execution. The query generated by the management plane 320 instructs the data plane to only search the identified subset of data cores that are identified to possibly contain relevant data items. The search is executed on the database indexes of the data cores in the subset to retrieve data items that satisfy one or more criteria defined in the search request.

Figure 4:
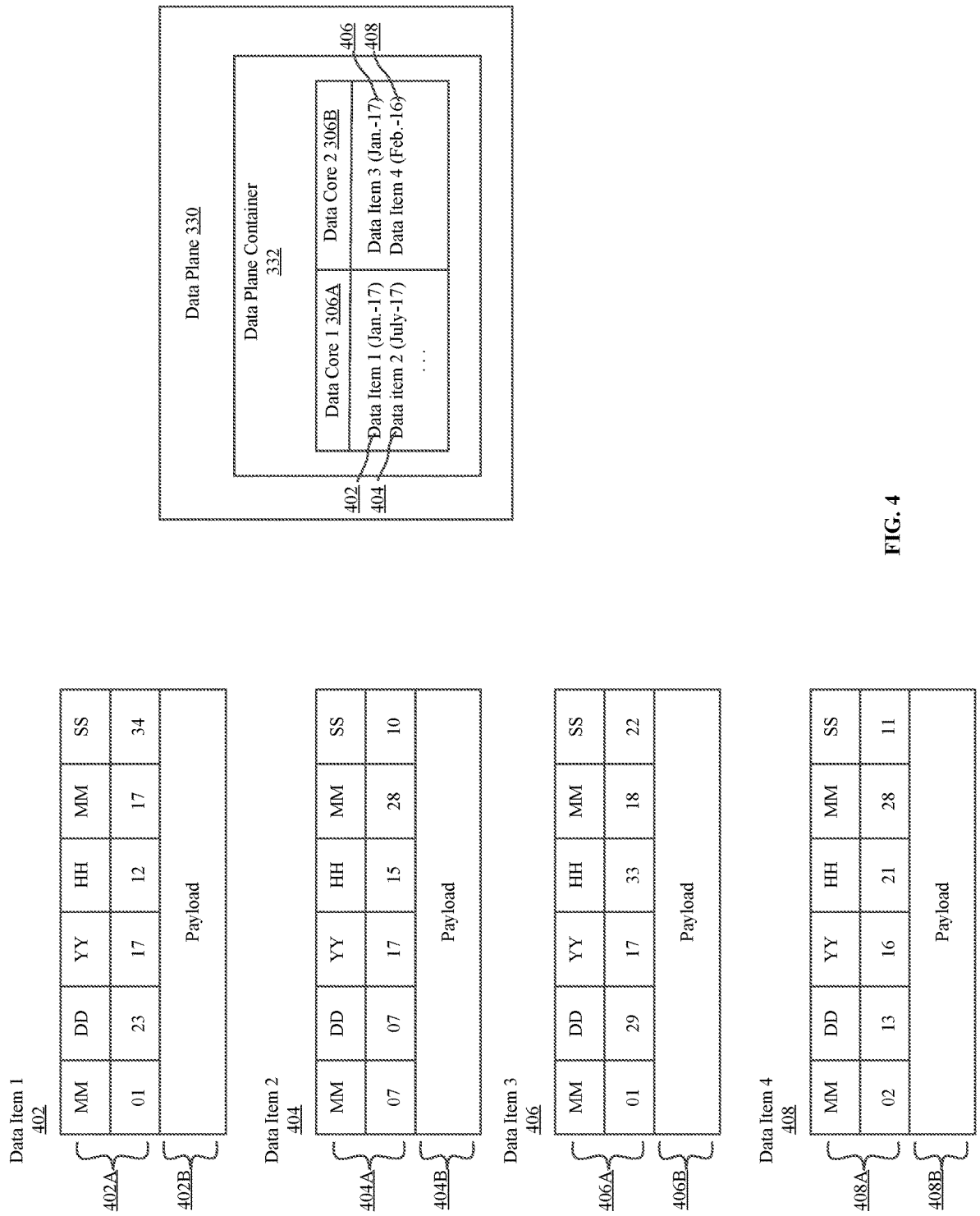
FIG. 4 depicts exemplary data items and the storage of the data items in corresponding data cores.

FIG. 4 depicts the anatomy of exemplary data items 402-408 and the storage of the data items 402-408 on exemplary data cores 306A-306B. In some embodiments, data core 1 306A is closed before data core 2 306B is open for ingestion. Data cores 306A and 306B store a plurality of data items that are indexed by their respective timestamps. In some embodiments, a data item is an event log or record that contains at least a timestamp and a payload of log data. For example, exemplary data item 1 402 includes timestamp 402A and payload 402B. In some embodiments, the timestamp of data item includes the month, date, year, hour, minutes, and seconds of the log or record. For example, data item 1 402 contains a timestamp 402A comprising of time components Jan. 23, 2017 at 12:17:34 PM. In some embodiments, the data cores store data items in accordance with a particular time resolution. For example, exemplary data cores 306A and 306B each store data items using a time resolution of months. In some embodiments, the data cores store data items in accordance with the original timestamps stored in the data items. The original timestamp or full timestamp of a data item indicates, for example, the month, date, year, hour, minutes, and seconds of the time at which the log or record was created.

In FIG. 4, data core 1 306A stores data items 1 and 2, while data core 2 306B stores data items 3 and 4. Data item 1 402 is indexed in data core 1 by its modified timestamp January 2017. Data item 2 404 is indexed in data core 1 306A by its modified timestamp July 2017. Similarly, data item 3 406 is indexed by its modified timestamp January 2017 in data core 2 306B. Data item 4 408 is indexed by its modified timestamp February 2016 in data core 2 306B. In some embodiments, data cores index data items by its full timestamp. In some embodiments, the full timestamp of a data item is the timestamp included in the original log or record. For example, data item 2 404 is indexed in data core 1 306A by its full timestamp Jul. 7, 2017 at 15:28:10.

Figure 6:
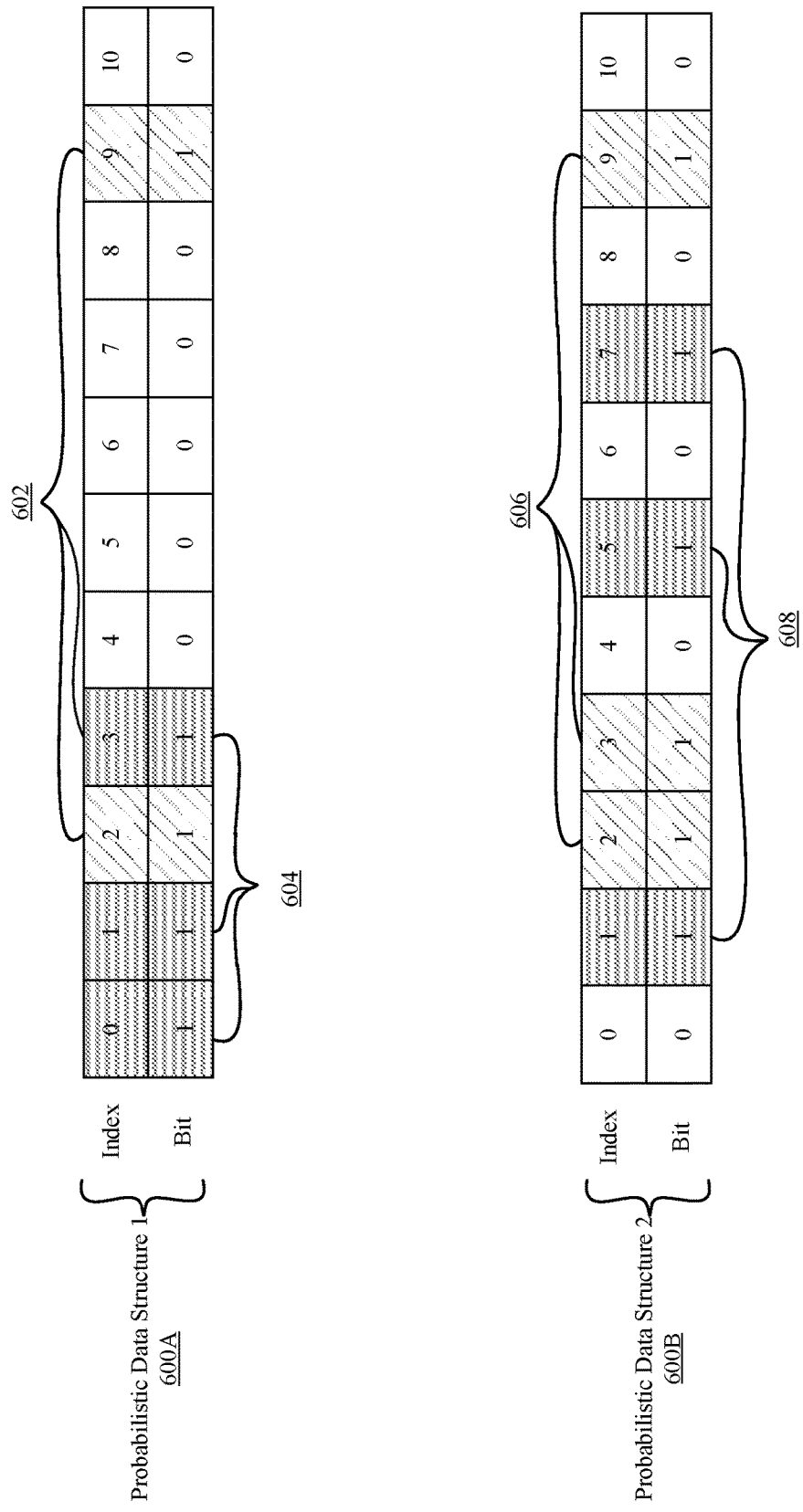
FIG. 6 depicts exemplary probabilistic data structures that indicate the membership of elements in the set.
Figure 7:
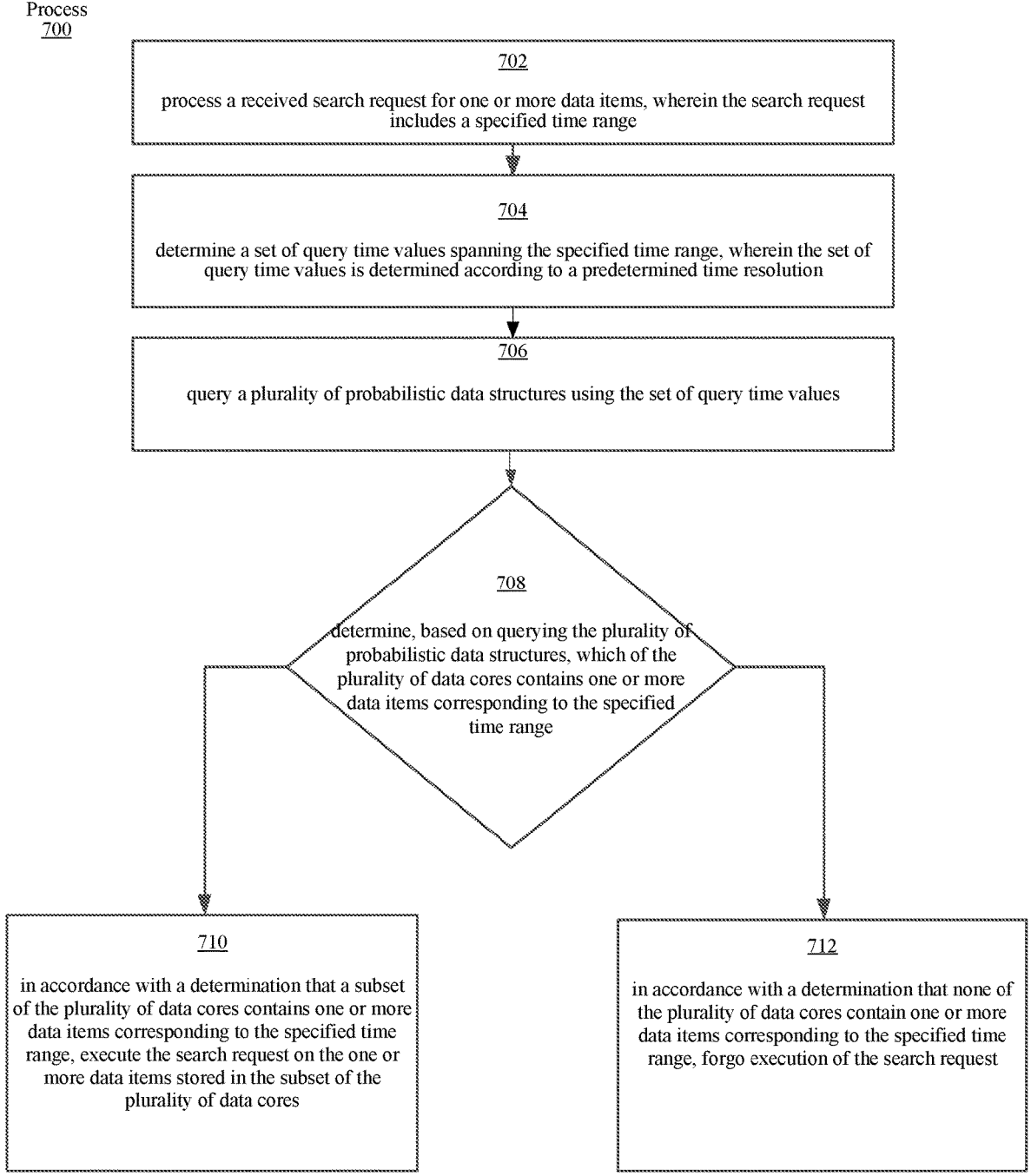
FIG. 7 depicts an exemplary method for executing a search request for data items in a specified time range on a subset of a plurality of data cores.

In some embodiments, a probabilistic data structure is used by each data core to track the membership of data items stored in the respective data core. FIG. 6 illustrates exemplary probabilistic data structures 600A and 600B used to track the membership of reference times corresponding to data items stored on the respective data cores 306A and 306B. The exemplary probabilistic data structures 600A and 600B stored in metadata 600 are similar to the respective probabilistic data structures 304A and 304B stored in metadata 302 in FIG. 3. The use of the probabilistic data structure provides the benefit that each data core no longer has to keep track of a time range of data items stored in the data core, which eliminates additional processing and storage overhead to keep the metadata updated. Further, the issue of overlapping time ranges among data cores is avoided. In some embodiments, the management plane 320 queries the plurality of probabilistic data structure associated with the plurality of data core to identify data cores that include data items with timestamps within the requested time range.

Probabilistic data structures provide space and time advantages because the data structure does not store the actual data items, but instead stores a small number of bits to track membership of elements in the set. In some embodiments, probabilistic data structures utilize algorithms such as Bloom filters, HyperLogLog, and Count-Min sketch to process large sets of data and to determine whether a data item is a member in the set of data. In some embodiments, probabilistic data structures use a bit map or bit array of a fixed size to represent a set with a large number of data items. In some embodiments, probabilistic data structures use hash functions to randomize and compactly represent the set of items. Probabilistic data structures provide the added benefit that adding a data item to the set or determining whether a data item is a member of the set takes a fixed constant time, independent of the total size of the set. This is advantageous because a management plane 320 may quickly identify a subset of data cores to search without adding overhead.

In some embodiments, a probabilistic data structure implements a Bloom filter to track membership of reference time values of a set of data items. A Bloom filter utilizes a bit array of m bits that are initialized to 0. Items are added to the bit array by using a predetermined number k of hash functions. Each hash function generates an array position. The bits corresponding to the array positions are set to 1 to indicate the membership of the element in the set. To test the membership of an item in the set, k hash functions are run on the element to obtain k array positions. If the bits at any of the k array positions are set to 0, then the element is definitely not in the set. If all the bits at all of the k array positions are set to 1, then the element is possibly in the set. However, a membership test may sometimes result in false positives, where an element that is not a member of the set is indicated to possibly be in the set. A false positive may occur if any one of the k bits corresponding to an element was set to 1 during the insertion of another element. The rate of false positives is reduced by increasing the size of the probabilistic data structure to reduce collisions and using a larger number of hash functions to utilize more array positions for each data item. In contrast, false negatives, where an element that is a member of the set is indicated to not be in the set, are not possible. Querying a probabilistic data structure results in either the tested element being "possibly in the set" or "definitely not in the set." In some embodiments, the more elements that are added to the set, the higher the probability of false positives.

FIG. 5 provides a table 500 of exemplary functions used to add a reference time value corresponding to a timestamp of a data item stored on the associated data core into a set of time values represented by an exemplary probabilistic data structure and to membership test whether a query time value is a member of the set. FIG. 6 depicts exemplary probabilistic data structures 600A and 600B that are used to represent the membership of the reference time values 602-608 corresponding to data items 402-408 stored on data cores 306A and 306B respectively. In some embodiments, probabilistic data structures 600A and 600B utilize hash functions to randomize and compactly represent a set of reference time values 602-608 corresponding to data items 402-408 stored on the corresponding data cores 306A and 306B. In some embodiments, probabilistic data structure represents the set of the reference time values 602-608 corresponding to data items 402-408 as a set of timestamps of the data items 402-408 stored on the data core. Thus, membership of a time value in the set of reference time values corresponding to stored data items indicates that the data core possibly contains a requested data item that falls within the requested time range.

In some embodiments, the probabilistic data structures 600A and 600B implement Bloom filters. In some embodiments, adding a reference time value corresponding to a timestamp of a data item to the probabilistic data structure involves hashing the reference time value of a data item a predetermined number of times. Table 500 provides an example where three exemplary hash functions are used to add reference time values to the set. Each hash function generates a hash value that corresponds to the array position in the probabilistic data structure. For example, in table 500, three bits are used to represent the reference time value of each data item added to the probabilistic data structure that uses an eleven bit array. In some embodiments, the probabilistic data structure tracks the membership of a data item using a reference time value based on the modified timestamp of the data item. For example, in table 500, the reference time value 502 of data item 402 is 117 based on the modified time stamp January 2017 of data item 402. The reference time value 502 is hashed three times using three different hash functions 502A-502C. The resulting hash values 502D-502F correspond to array positions of the bit array implementing the probabilistic data structure 600A. For example, to add data item 1 402 to the set, the bits at array positions 2, 9, and 3 corresponding to hash values 506D-506F are set to 1. Similarly to add data item 2 404 to the set, the bits at array positions 3, 0, and 1 corresponding to hash values 504D-504F are set to 1. As illustrated in probabilistic data structure 600A, the array positions are annotated to indicate the membership of reference time value 1 502 and reference time value 2 504, which correspond to respective data items 1 402 and 2 404 in the set.

Reference time value 506 corresponding to data item 406 is added to the set represented by probabilistic data structure 600B by hashing the reference time value 506 based on the modified timestamp of data item 3 406 and setting the array positions 2, 9, and 3, corresponding to hash values 502D-502F to 1. Similarly, reference time value 4 508 is added to the set represented by probabilistic data structure 600B by hashing the reference time value 508 based on the modified timestamp of data item 408 and setting the array positions 5, 7, and 1 corresponding to hash values 508D-508F to 1. As illustrated in probabilistic data structure 600B, the array is annotated to indicate membership of reference time value 3 606 in the set and the array are annotated to indicate membership of reference time value 4 608 in the set.

In some embodiments, if two or more data items stored on the same data core have the same reference time value, the same set of hash values will be used to represent the two or more data items with the same reference time values as illustrated by reference time values 502 and 506 in table 500. In some embodiments, if the time resolution of the data core is changed at a later time, the probabilistic data structure will need to be regenerated by adding each data item to the set using the new reference time value based on the new modified time stamp of each data item.

In some embodiments, the management plane 320 queries the plurality of probabilistic data structures to determine whether at least one query time value within the requested time range is found in the set of reference time values corresponding to data items stored in the data core. A set of query time values are generated by the management plane 320 to represent time values in the specified time range. The set of query time values are used to test the probabilistic data structures to determine whether a data core contains data items within the specified time range. For example, the set of query values generated for the specified time range Jan. 1, 2017-Apr. 1, 2017 using a predetermined time resolution of months include 117 (January 2017), 217 (February 2017), 317 (March 2017), and 417 (April 2017). The query values 117, 217, 317, and 417 are then used to query the probabilistic data structure to determine whether the associated data core contains data items within the time range Jan. 1, 2017-Apr. 1, 2017. If any one of the query values is a member of the set, then the associated data core is searched. If none of the query values are members of the set, then the associated data core is not searched. In some embodiments, the predetermined time resolution used for determining the query time values is the same predetermined time resolution used by the data cores. In some embodiments, the predetermined time resolution is a higher or lower time resolution than the time resolution used by the data cores.

Table 500 depicts exemplary results when exemplary management plane 320 queries exemplary probabilistic data structure 600A to determine whether a data core contains the requested data items. To query a probabilistic data structure, the management plane 320 first calls the hash functions used by the probabilistic data structure using the same hash functions that were used to add data items to the set. For example, if the query time value is 117, the hash values generated by the hash functions are 2, 9, and 3. A look-up of the bits at array positions 2, 9, and 3 reveals that all three bits are set to 1. This indicates that the query time value is a member of the set, and that the associated, exemplary data core 1 306A possibly contains data items in the set of data items stored on exemplary data core 306A. Similarly, querying exemplary probabilistic data structure 600B with the same query value indicates that the associated, exemplary data core 2 306B may also possibly contain data items in the set of data items stored on exemplary data 2 306B core. Since both data cores 306A and 306B possibly contain data items that are relevant results for the search request, both data cores 306A and 306B are added to the subset of cores to be searched.

If the query time value is found not to be in the set, this indicates that the data core definitely does not contain any relevant data items that fit the time range criteria of the search request. The corresponding data core is therefore not searched. For example, if a query time value 518 is used to query the probabilistic data structure, hashing the query time value returns the hash values 4, 6, and 10. A look-up of the bits at array positions 4, 6, and 10 reveals that all three bits are set to 0 on both cores. This indicates that neither exemplary data core 1 306A exemplary nor data core 2 306B contains relevant data items that include timestamps from May 2018.

In the description below, process 700 is described as being performed by a management plane 320 in a distributed computing system 200. In some embodiments, the operations of process 700 are distributed over several management nodes 222 in a management plane 320. It should be appreciated that the order for performing the blocks of FIG. 7 can be modified. Further, one or more blocks of process 700 can be optional and/or additional blocks can be performed.

At block 702, the management plane of the distributed computing system processes a received search request for one or more data items within a specified time range. In some embodiments, user terminals provide customers with access to a distributed computing system. In some embodiments, user terminals send the queries provided by a user to the management plane to process. In some embodiments, the user query includes one or more criteria, such as a time range and a text string. The management plane processes the user query from the user interface layer and requests a search to be executed on the data items stored in the data plane. In some embodiments, the user interface layer is implemented by user terminals or an administrator module. The specified time range of a search request for data items specifies one or more of a month, date, year, hour, minutes, and seconds. For example, a search request may specify a time range of Jan. 17, 2017 to Apr. 1, 2017 or May 4, 2017 at 11:34 AM to May 31, 2017 at 12:00 PM. In some embodiments the specified time range includes a single time element such as a particular month or year. In some embodiments, the management plane receives a request specifying a time range for log data that is stored across a plurality of data cores (e.g., data cores 234-238 or 306A-306B) in one or more data plane containers stored in the data plane. In some embodiments, the management plane receives a request specifying a time range for log data is stored in a secondary storage that is archived and not readily available. In some embodiments the request specifies a time range for log data that is not found in the data containers in the data plane.

At block 704, the management plane determines a set of query time values spanning the specified time range, where the set of query time values is determined according to a predetermined time resolution. In some embodiments, a predetermined time resolution is the time resolution used by the plurality of data cores to store data items. In some embodiments, the predetermined time resolution used to determine the set of query time values is different than the predetermined time resolution used by the plurality of data cores. In some embodiments, the predetermined time resolution is based on an ingestion rate of data items by the data plane. For example, a set of time values using a predetermined time resolution of months spanning a specified time range of Dec. 17, 2017 to Apr. 1, 2018 includes the set of time values 118, 218, 318, 418, and 1217 corresponding to January 2018, February 2018, March 2018, April 2018, and December 2017. In another example, the set of time values using a predetermined time resolution of hours spanning a specified time range of May 4, 2017 at 21:34:00 to May 5, 2017 at 00:15:17 includes the set of time values 541721, 541722, 541723, 551700 corresponding to May 4, 2017 hour 21, May 4, 2017 hour 22, May 4, 2017 hour 23, and May 5, 2017 hour 00.

At block 706, the management plane queries a plurality of probabilistic data structures 304A and 304B using the set of query time values where each probabilistic data structure is associated with a respective data core of the plurality of data cores. In some embodiments, the plurality of probabilistic data structures are stored as metadata in the management plane. In some embodiments, each probabilistic data structure tracks the data items stored on the corresponding data core by its reference time value. In some embodiments, the reference time value is a modified timestamp that is not the full time stamp of a data item. In some embodiments, the reference time value corresponds to the full timestamp of a data item stored in the respective data core. In some embodiments, the full timestamp of a data item is the original timestamp included in the log or record. In some embodiments, each reference time value is a unique time value in the set of reference time values. In some embodiments, a reference time value is the modified timestamp of a data item stored in the data core that is based on the time resolution specified by the data core. For example, a data item with a timestamp May 4, 2017 at 21:34:23 has a modified timestamp of May 2017 based on a month time resolution. In some embodiments, a time resolution of each reference time value is lower than a time resolution specified by a data core. In some embodiments, the time resolution of each reference time value is of a greater resolution than the time resolution specified by a data core.

When the management plane queries the probabilistic data structure, the set of query time values are used to check for membership in the respective set of reference time values indexed in the respective probabilistic data structure. In some embodiments, the probabilistic data structure is a Bloom filter. Each query time value is membership tested to determine if the query time value is a member of the set of reference time values that are associated with data items stored in the data core. In some embodiments, a membership testing involves the use of a predetermined number of hash functions. If the query time value is determined to be a member, then it is possible that data items that have timestamps within the specified time range are stored on the data core. If the query time value is determined to not be a member, then no data items in the data core have timestamps within the specified time range.

At block 708, the management plane determines which data cores to execute the search request on based on the outcome of the query of the probabilistic data structures. At block 712, if a probabilistic data structure indicates that a data core definitely does not contain any data items in the specified time range, then the data core is excluded from the subset of data cores to search.

At block 710 if a probabilistic data structure indicates that a data core possibly contains data items in the specified time range, then the data core is added to the subset of data cores to search. In some embodiments, only data cores that are in the subset of the plurality of data cores are searched. In some embodiments, data cores that are not in the subset of the plurality of data cores are not searched. In some embodiments, a false positive may indicate that data items at the query time value are stored in the data core, when it is actually not. However, a false positive does not preclude a data core from being added to the subset of searchable data cores. In some embodiments, false positive rates may be reduced by increasing the size of the probabilistic data structure or by increasing the number of hash functions used. In some embodiments, once the management plane has determined a subset of data cores to search, the management plane will execute the search request on the subset of data cores.

The foregoing descriptions of specific embodiments, as described with reference to FIGS. 1-7, have been presented for purposes of illustration and description. They are not intended to be exhaustive or to limit the scope of the claims to the precise forms disclosed, and it should be understood that many modifications and variations are possible in light of the above descriptions.

What is claimed is:

1. A method for processing time-range queries on databases with timestamped data items stored across a plurality of data cores in a distributed computing system, the method comprising:
 at the distributed computing system:
  receiving a search request for one or more data items, wherein the search request is limited to data items within a specified time range;
  querying a plurality of probabilistic data structures stored as metadata in a management plane of the distributed computing system using a set of query time values that span the specified time range, wherein each probabilistic data structure is used to track a membership of data items stored within a respective data core of the plurality of data cores by tracking whether any data items stored within the respective data core have reference time values falling within each query time value of the set of query time values that span the specified time range;

determining, based on querying the plurality of probabilistic data structures, which of the plurality of data cores contains one or more data items corresponding to the specified time range; and in accordance with a determination that a subset of the plurality of data cores contains one or more data items corresponding to the specified time range, executing the search request on the subset of the plurality of data cores.

2. The method of claim 1, wherein a size of each probabilistic data structure is based on an ingestion rate of data items by the data cores.

3. The method of claim 1, wherein a false positive rate of a probabilistic data structure of the plurality of probabilistic data structures is based on a size of the probabilistic data structure.

4. The method of claim 1, further comprising determining a set of query time values spanning the specified time range, wherein the set of query time values is determined according to a predetermined time resolution.

5. The method of claim 4, wherein the set of predetermined time resolution is based on an ingestion rate of data items by the data plane.

6. The method of claim 1, wherein the method is performed at the management plane of the distributed computing system.

7. The method of claim 1, wherein each probabilistic data structure does not index the timestamps of the data items stored in the respective data core.

8. The method of claim 1, wherein one or more of the plurality of probabilistic data structures each comprise a bloom filter.

9. A non-transitory computer-readable storage medium storing one or more programs configured to be executed by one or more processors of a distributed computing system, the one or more programs including instructions for:

at the distributed computing system:
  receiving a search request for one or more data items stored within one or more data cores of a plurality of data cores in the distributed computing system, wherein the search request is limited to data items within a specified time range;
  querying a plurality of probabilistic data structures stored as metadata in a management plane of the distributed computing system using a set of query time values that span the specified time range,
    wherein each probabilistic data structure is used to track a membership of data items stored within a respective data core of the plurality of data cores by tracking whether any data items stored within the respective data core have reference time values falling within each query time value of the set of query time values that span the specified time range;
  determining, based on querying the plurality of probabilistic data structures, which of the plurality of data cores contains one or more data items corresponding to the specified time range; and
  in accordance with a determination that a subset of the plurality of data cores contains one or more data items corresponding to the specified time range, executing the search request on the subset of the plurality of data cores.

10. The non-transitory computer-readable storage medium of claim 9, wherein the one or more programs further include instructions for:
  in accordance with a determination that none of the plurality of data cores contain one or more data items corresponding to the specified time range, forgoing execution of the search request.

11. The non-transitory computer-readable storage medium of claim 9, wherein the method is performed at a management plane of the distributed computing system and wherein the plurality of probabilistic data structures are stored as metadata in the management plane.

12. A distributed computing system for processing time-range queries on databases with timestamped data items stored across a plurality of data cores, comprising:
  one or more processors; and
  memory storing one or more programs configured to be executed by the one or more processors, the one or more programs including instructions for:
    receiving a search request for one or more data items, wherein the search request is limited to data items within a specified time range;
    querying a plurality of probabilistic data structures stored as metadata in a management plane of the distributed computing system using a set of query time values that span the specified time range,
      wherein each probabilistic data structure is used to track a membership of data items stored within a respective data core of the plurality of data cores by tracking whether any data items stored within the respective data core have reference time values falling within each query time value of the set of query time values that span the specified time range;
    determining, based on querying the plurality of probabilistic data structures, which of the plurality of data cores contains one or more data items corresponding to the specified time range; and
    in accordance with a determination that a subset of the plurality of data cores contains one or more data items corresponding to the specified time range, executing the search request on the subset of the plurality of data cores.

13. The distributed computing system of claim 12, wherein the one or more programs further include instructions for:
  in accordance with a determination that none of the plurality of data cores contain one or more data items corresponding to the specified time range, forgoing execution of the search request.

14. The distributed computing system of claim 12, wherein the one or more programs further include instructions for:
  determining a set of query time values spanning the specified time range, wherein the set of query time values is determined according to a predetermined time resolution,
  wherein querying the probabilistic data structures comprises querying the probabilistic data structures using the set of query time values.

* * * * *